United States Patent [19]

Sheldon

[11] 4,331,359
[45] May 25, 1982

[54] WINDOW SHIELD FOR VEHICLE BODY

[75] Inventor: Steve S. Sheldon, Barboursville, W. Va.

[73] Assignee: Skipura Enterprises, Inc., Barboursville, W. Va.

[21] Appl. No.: 102,871

[22] Filed: Dec. 12, 1979

[51] Int. Cl.³ .................... B60J 1/16; B60J 1/20
[52] U.S. Cl. .......................... 296/146; 49/63; 296/95 R
[58] Field of Search ............ 296/146, 155, 95 R, 296/97 G, 97 J; 49/63

[56] References Cited

U.S. PATENT DOCUMENTS

| 1,864,048 | 6/1932 | McNutt | 296/155 |
| 2,102,454 | 12/1937 | Bennett | 296/976 |
| 2,650,858 | 9/1953 | Lange | 296/155 |
| 2,710,058 | 6/1955 | Gronlund et al. | 49/63 |
| 2,780,458 | 2/1957 | Thaxton | 49/63 |
| 3,923,339 | 12/1975 | McDonald | 296/95 R |

Primary Examiner—Joseph F. Peters, Jr.
Assistant Examiner—Ross Weaver
Attorney, Agent, or Firm—Lowe, King, Price & Becker

[57] ABSTRACT

A window shield formed of a penetration resistant material is positioned outside and adjacent a standard glass window of an automobile or other vehicle. The window and shield are congruent and extend downwardly into a door panel through a pair of parallel, cushioned supporting channels. The window and shield are independently operated by at least one electric motor for vertical movement between open and closed positions under control of an electric switch mounted inside the cabin of the vehicle. In the open position, the shield is retracted by the motor fully into the door panel; in the closed position, the shield is extended upwardly by the motor to enclose the access opening of the body. When closed, the upper and side edges of the window and shield are sealed to the body of the vehicle by a resilient gasket.

14 Claims, 9 Drawing Figures

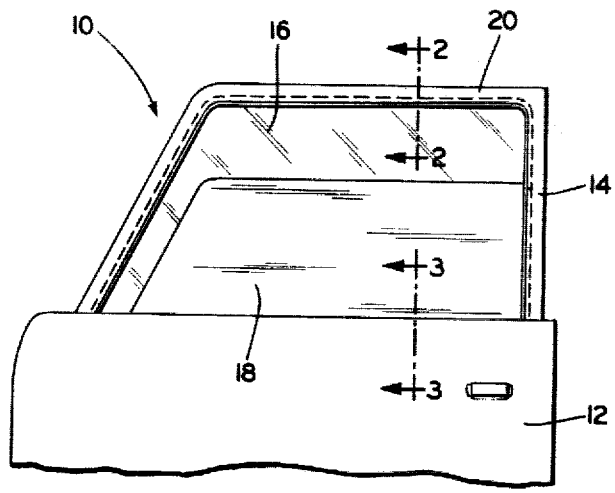
FIG. 1
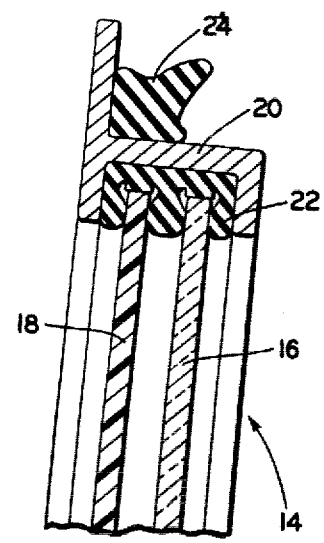
FIG. 2
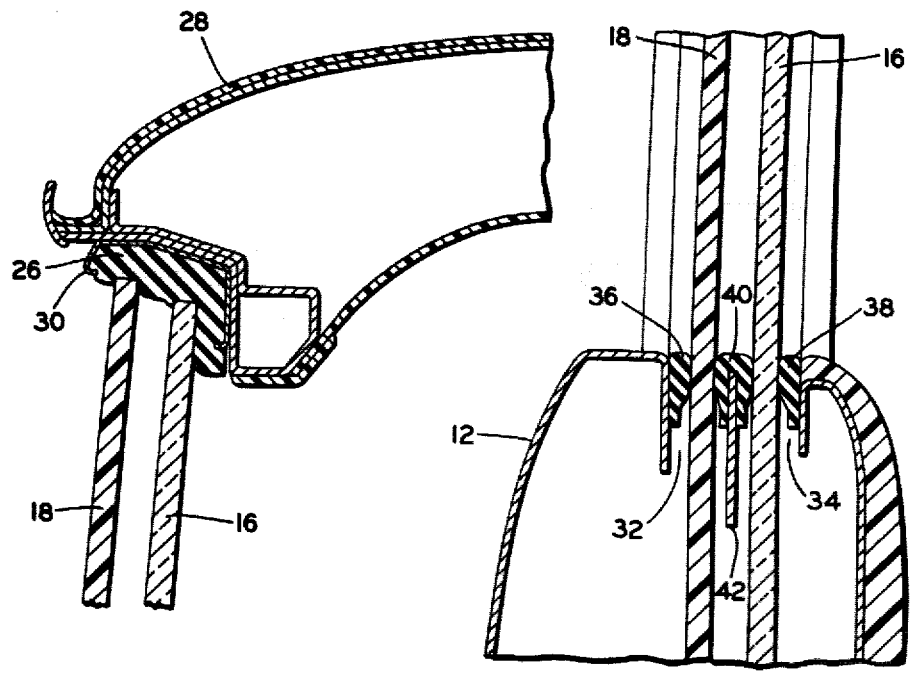
FIG. 4
FIG. 3

WINDOW SHIELD FOR VEHICLE BODY

TECHNICAL FIELD

The present invention relates generally to protective shields for vehicle windows and more particularly toward a retractable, penetration resistant window shield that is supported in the door panel of an automobile and is manually controlled from within the cabin to open or close.

BACKGROUND ART

Vandalism and other crimes have been increasing throughout the United States and particularly in urban areas. Automobile related crime, e.g., breaking and entering the automobile for the purpose of theft of the automobile or of property within the automobile and the personal safety of drivers and passengers have become of major concern. The ability of the automobile to resist unauthorized entry is limited, however, because access to the interior is prevented only by the glass windows enclosing the automobile body. The glass windows can be easily broken or, in the case of hardtop style bodies, pried open to gain entry to the interior of the automobile. There exists a need, therefore, for protective shields of some type which will protect the glass windows and enclose the interior of the automobile to avoid vandalism or theft and to protect the occupants.

U.S. Pat. No. 3,855,898 discloses a bulletproof glass panel that is mounted over the standard automobile windows using brackets. While these panels are effective to prevent penetration of the automobile windows by projectiles, storage of the panels following removal is a problem. Also, because it is possible to remove the panels from outside the vehicle, security is reduced. There still exists a need, therefore, for automotive window shields that are not removable from the standard automobile window and for which there are no storage requirements.

One object of the present invention, therefore, is to provide a new and improved protective shield for windows.

Another object is to provide a protective shield for vehicle windows that are not removable from outside the vehicle.

An additional object is to provide a protective shield for automotive windows wherein the shield is withdrawn into the vehicle when open.

DISCLOSURE OF INVENTION

In a vehicle body, a protective shield formed of a penetration resistant material is positioned outside and adjacent a standard automobile window to be protected. The shield and window extend downwardly through a parallel pair of supporting channels in the panel and are independently opened and closed by at least one electric motor controlled by switches manually accessible by the driver. The shield, which may be transparent or opaque, is congruent with the standard window and is stored within the door panel when open.

In accordance with one embodiment, the window and shield are operated independently by first and second electric motors, respectively. In another embodiment, a single electric motor is selectively coupled to the window and shield under control of a solenoid. Operation of the window and shield may be sequenced to enable (1) closing of the shield only after the window is closed, or (2) simultaneous opening or closing of the window and shield.

Still other objects and advantages of the present invention will become readily apparent to those skilled in this art from the following detailed description, wherein I have shown and described only the preferred embodiments of the invention, simply by way of illustration of the best modes contemplated by me of carrying out my invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF DRAWINGS

FIG. 1 is a side view of an automobile door assembly and window provided with a protective shield, in accordance with the invention;

FIG. 2 is a cross sectional view of the upper end of the door assembly taken along the line 2—2 in FIG. 1;

FIG. 3 is a cross sectional view of the door assembly, shield and window of FIG. 1 viewed along the line 3—3;

FIG. 4 is a cross sectional view of an automobile hardtop structure provided with a window shield in accordance with the invention;

BEST MODE FOR CARRYING OUT THE INVENTION

Figure 5:
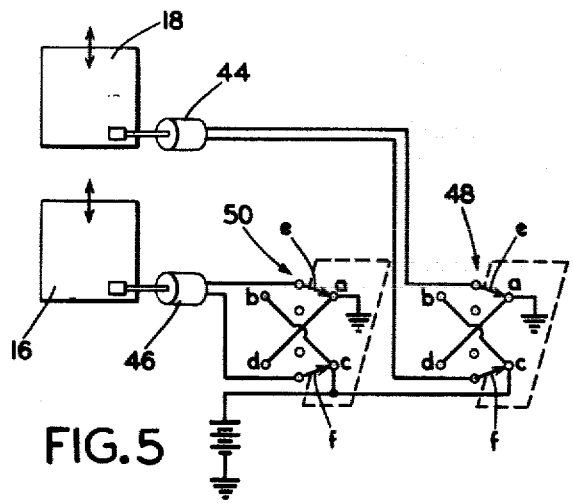
FIG. 5 is a circuit diagram showing a dual motor control circuit in accordance with one embodiment of the invention.

Referring to FIGS. 1–4, the door assembly 10 of an automobile comprises a supporting panel 12 secured to a window frame 14 defining an access opening to the interior of the automobile. A standard glass or plastic window 16 is positioned within the frame 14 and operated by a motor or hand crank to be indexed upwardly into (1) a closed position, as shown, wherein the window encloses the access opening and downwardly into (2) an open position wherein the window is retracted within the supporting door panel 12. In accordance with the invention, a second window or shield 18 is located within the access opening immediately adjacent and outside window 16 (see FIG. 2). The shield 18 is formed of a penetration resistant material, such as stainless steel or bulletproof glass, and may be transparent, translucent or opaque. The shield 18 and window 16 are congruent with each other so that the shield, if transparent, will have an appearance identical to that of the standard window 16.

The shield 18 and window 16 are independently movable between open and closed positions as explained in detail below so that, in practice, the shield 18 can be maintained open until the automobile is parked or security is otherwise required.

In a sedan type automobile body, the upper end of the frame 14 at 20 is rectangular, as shown in FIG. 2, and contains a dual track gasket 22 that provides a resilient seal to the upper ends of window 16 and shield 18 and also maintains the window and shield spaced apart from each other when closed, as shown in FIG. 2. A gasket 24 is positioned on the upper surface of frame 14 to form a door seal in a conventional manner. In a hardtop style automobile body (see FIG. 4), the upper ends of window 16 and shield 18 are positioned against a stepped gasket 26 maintained in position against vinyl covered roof 28 by an angled bracket 30. It is to be noted that in the sedan design in FIG. 2, it is virtually impossible to gain access to the interior of the automobile by prying around the upper ends of shield 18 and window 16 at dual track gasket 22. In the hardtop design of FIG. 4, it is very difficult to engage a prying tool around the upper end of shield 18 due to the presence of angle bracket 30. Also, because the upper end of window 16 is positioned lower than the upper end of shield 18 is, it is virtually impossible to engage a prying tool over the upper end of the window since there would be interference between the bracket 30 and window 16 by the shield 18 which acts as a fulcrum to any tool inserted under the gasket 26.

With reference to FIG. 3, the window 16 and shield 18 extend downwardly into door panel 12 through parallel tracks 32 and 34. The window 16 and shield 18 are maintained separated from each other and are cushioned by outer gaskets 36 and 38 as well as by inner gasket 40. The inner gasket 40 is mounted along a central rail 42 between the window 16 and shield 18.

Figure 6:
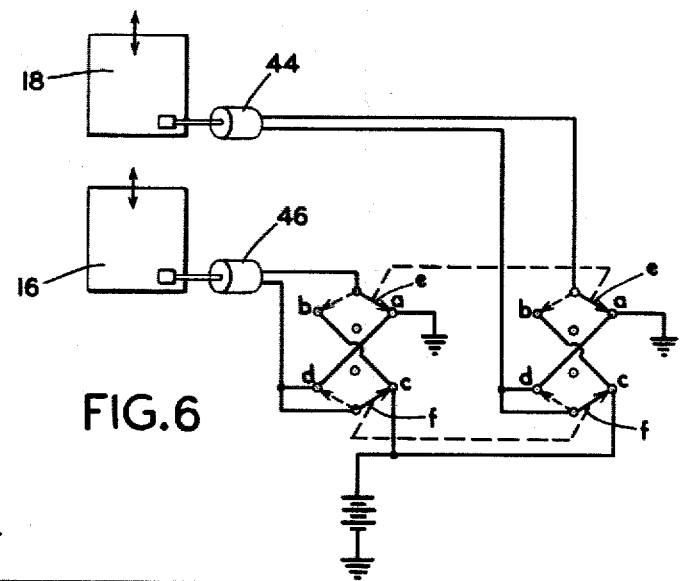
FIG. 6 is a diagram showing a modification of the circuit of FIG. 5 wherein the window and shield are operated to open or close simultaneously using two electric motors.
Figure 7:
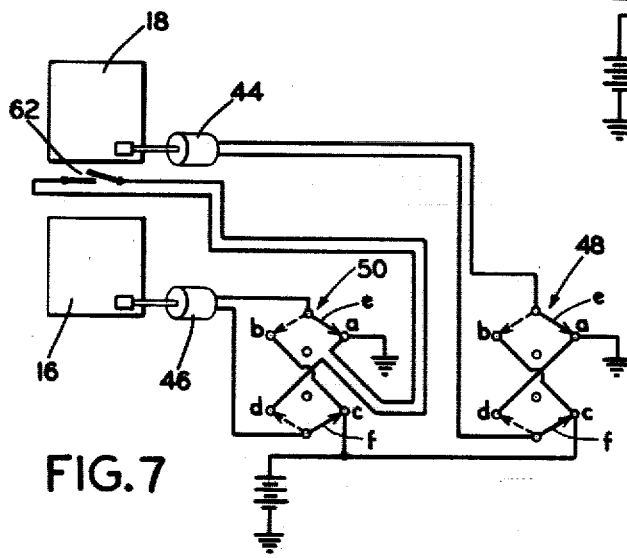
FIG. 7 is a schematic diagram showing sequencing circuitry for controlling operation of the first and second motors illustrated in FIG. 5.

The window 16 and protective shield 18 can be operated by conventional hand cranks (not shown) or by electric motors to open and close the window and shield in response to electrical switches mounted on the door panel or dashboard of the automobile. In the embodiment of FIGS. 5, 6 and 7, two electric motors 44, 46 are independently operated to control movement of the shield 18 and window 16, respectively, whereas in FIGS. 8 and 8A, a single motor 45 controls movement of the window and shield through a common gear 56 that is shifted under control of an electric solenoid 58.

Referring now to FIG. 5 in detail, shield 18 and window 16 are operated to open or close by the electric motors 44 and 46 coupled to the shield and window by conventional mechanical means which are not described in detail for brevity. The motors 44 and 46 are energized by automotive battery B through reversible switches 48 and 50, respectively, mounted within the cabin of the automobile on the door panel or dashboard to be accessible to the driver. Each switch 48, 50 comprises four electrical contacts 48a–48d, 50a–50d in a two-by-two array selectively interconnected by a pair of normally open, three-position ganged switch operators 48e, 48f and ganged operators 50e, 50f. In a conventional manner, reversible switch operators 50e and 50f are connected to control positive or negative energization of motor 46 by battery B respectively to open or close window 16. Similarly, reversible switch operators 48e and 48f are connected conventionally to control positive or negative energization of motor 44 to open or close the shield 18. Assuming, for example, that switch operator 48e is connected to contact 48a and the ganged operator 48f is connected to contact 48c, a voltage from battery B at a first polarity is applied to motor 44 to cause the motor to rotate in a direction to close protective shield 18. If switch operator 48e is connected to contact 48b, and ganged operator 48f is connected to contact 48d, on the other hand, the motor 44 is energized at opposite polarity by battery B to open the shield 18. Similar operation of window motor 16 by the reversible switch 50 will not be described herein for brevity. The operators of each of the switches 48, 50 are spring biased to their middle positions (not labeled) between contacts a, b and c, d to open circuit the motors 44 and 46 and thereby deenergize them.

It is apparent that the provision of reversible switches 48 and 50 enables independent opening and closing of the window 16 and shield 18. In accordance with a first modification of the embodiment shown in FIG. 5, switch operators 48e and 50e may be ganged together and switch elements 48f and 50f may be ganged together, as shown in FIG. 6, to cause simultaneous opening or closing of the shield 18 and window 16. Bearing in mind that operators 50e and 50f are also ganged to each other and that operators 48e and 48f are further ganged to each other, it is apparent that closure of either pair of the switch operators 48e, 48f or 50e, 50f to contacts a, c will cause corresponding closure to contacts a, c of the other pair of operators to operate both of the motors 44 and 46 to thereby close the shield 18 and window 16; similarly, closure of either pair of switch operators 48e, 48f or 50e, 50f to contacts b, d will cause corresponding closure of the other pair of operators to provide simultaneous opening of the shield 18 and window 16.

Referring to FIG. 7, a second modification of the embodiment of FIG. 5 is shown, wherein the shield 18 and window 16 are sequenced relative to each other by a limit switch 62 that detects when shield 18 is open and controls motor 46 to open window 16 only when the shield 18 is fully open. This sequence has particular utility since it is in general not useful to operate the window 16 with shield 18 not fully open. For example, unless the shield 18 is open, it is not possible to obtain inflow of fresh air by opening the window 16 and similarly if the shield is opaque, opening the window 16 does not enable occupants to view the outside. To prevent unnecessary battery usage, limit switch 62 is positioned at the lower end of shield 18 to be closed when the shield is fully retracted into door panel 12, and is connected in circuit with one leg of reversible switch 50 between contacts a and d. The presence of limit switch 62 in leg a–d prevents operation of motor 46 to open window 16 when switch operators 50e and 50f are in the position shown in dotted lines. Thus, unless limit switch 62 is closed by shield 18 in the fully open position wherein the shield is retracted fully into the door panel 12, energization of motor 46 at a polarity to open window 16 is prevented. Closing of window 16 or opening or closing of the shield 18, however, are unaffected by the limit switch 62.

Figure 8:
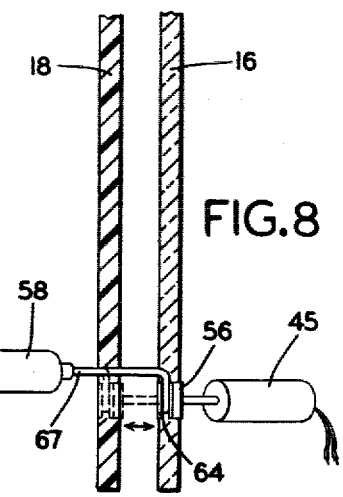
FIGS. 8 and 8A illustrate a second embodiment of the invention wherein the window and shield are operated to open or close by a single electric motor.
Figure 8A:
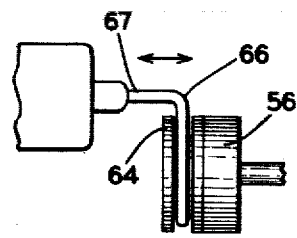

Referring to FIG. 8, a second embodiment of the invention is disclosed, wherein protective shield 18 and window 16 are controlled to open or close by a single motor 45 rotating gear 58 that is indexable along a splined shaft 64 between a first position (shown in solid lines) and a second position (dotted lines). Similarly to motors 44 and 46, the motor 45 is a reversible motor to enable the window 16 and shield 18 to be opened or closed depending upon direction of rotation of the motor. One end of the gear 56 has a lip portion 64 coupled by a fork 66 (FIG. 8A) that forms an end of the armature 67 of an electric solenoid 58. The solenoid 58 is controlled to index the gear 56 between the first and second positions in response to manual control inputs by electrical switches (not shown) within the cabin of the automobile. In order to unitize the motor and solenoid control functions, the solenoid switch and switch for controlling direction of rotation of motor 45 are coupled together so that the solenoid indexes gear 56 into the first position if either opening or closing of window 16 is required and indexes the gear into the second position if opening or closing of shield 18 is required. In practice, the motor control switch for motor 45 may be a reversible switch of the type identified by 48, 50 in FIG. 5; the solenoid may be tripped between the first and second armature positions shown in FIG. 8 in response to operation of the window and shield switches corresponding to switches 48 and 50 to either open or close the window or shield.

In this disclosure, there is shown and described only the preferred embodiments of the invention, but, as aforementioned, it is to be understood that the invention is capable of use in various other combinations and environments and is capable of changes or modifications within the scope of the inventive concept as expressed herein.

What is claimed is:

1. A window and window shield system for a vehicle body, comprising a supporting panel having first and second channels each adapted to receive a window structure; an inner window and an outer window located in said panel and extending outwardly through said first and second channels, respectively to enclose an access opening in the body; said inner window being formed of a transparent plastic or glass, said outer window being formed of a penetration resistant material; switch means; motor means responsive to said switch means and coupled to said inner and outer windows for selectively extending and retracting said inner window relative to said panel between a closed position wherein said inner window is extended outwardly from said panel to enclose said access opening and an open position wherein said inner window is retracted into said panel, said switch means including means for enabling opening of said inner window only when the outer window is open.

2. A window and window shield system for a vehicle body, comprising a window frame; a supporting panel having first and second channels each adapted to receive a window structure; an inner window and an outer window located in said panel and extending outwardly through said first and second channels, respectively to enclose an access opening in the body; said inner window being formed of a transparent plastic or glass, said outer window being formed of a penetration resistant material; sealing means partially extending around an upper end of the outer window, said sealing means preventing access to the inner window from outside the vehicle body when said outer window is in a closed position contacting said sealing means, said sealing means also maintaining said inner and outer windows spaced apart from each other in a closed position and sealing and stabilizing said inner and outer windows within the window frame, wherein said sealing means includes a stepped gasket adapted for attachment to a roof of a hard topped vehicle, said gasket retaining upper ends of said inner and outer windows, said upper end of the outer window being positioned higher than the upper end of said inner window thereby preventing access into said vehicle by prying said inner window; first moving means for selectively extending and retracting said inner window relative to said panel between a closed position wherein said inner window is extended outwardly from said panel to enclose said access opening and an open position wherein said inner window is retracted into said panel; and second moving means for selectively extending and retracting said outer window relative to said panel between the closed position and the open position.

3. A window and window shield system for a vehicle body comprising a window frame; a supporting panel having first and second channels each adapted to receive a window structure; an inner window and an outer window located in said panel and extending outwardly through said first and second channels, respectively to enclose an access opening in the body; said inner window being formed of a transparent plastic or glass, said outer window being formed of a penetration resistant material; first and second upper channels including sealing means for maintaining said inner and outer windows spaced apart from and parallel to each other in a closed position, said sealing means sealing and stabilizing said inner and outer windows within said window frame, wherein said sealing means includes a stepped gasket adapted for attachment to a roof of a hard topped vehicle, said gasket retaining upper ends of said inner and outer windows, said upper end of the outer window being positioned higher than the upper end of said inner window thereby preventing access into said vehicle by prying said inner window.

4. A window and window shield system for a vehicle body, comprising a window frame; a supporting panel having first and second channels each adapted to receive a window structure; an inner window and an outer window located in said panel and extending outwardly through said first and second channels, respectively to enclose an access opening in the body; said inner window being formed of a transparent plastic or glass, said outer window being formed of a penetration resistant material; sealing means partially extending around an upper end of the outer window, said sealing means preventing access to the inner window from outside the vehicle body when said outer window is in a closed position contacting said sealing means, said sealing means also maintaining said inner and outer windows spaced apart from each other in a closed position and sealing and stabilizing said inner and outer windows within the window frame, wherein said sealing means includes a dual track gasket extending substantially through an upper channel of the window frame, said upper channel being of substantially rectangular configuration to thereby receive said inner and outer windows in the dual track gasket.

5. A window and window shield system for a vehicle body, comprising a window frame; a supporting panel having first and second channels each adapted to receive a window structure; an inner window and an outer located in said panel and extending outwardly through said first and second channels, respectively to enclose an access opening in the body; said inner window being formed of a transparent plastic or glass, said outer window being formed of a penetration resistant material; first and second upper channels including sealing means for maintaining said inner and outer windows spaced apart from and parallel to each other in a closed position, said sealing means sealing and stabilizing said inner and outer windows within said window frame, wherein said sealing means includes a dual track gasket extending substantially through an upper channel of the window frame, said upper channel being of substantially rectangular configuration to thereby receive said inner and outer windows in the dual track gasket; first means for selectively extending and retracting said inner window relative to said panel between a closed position wherein said inner window is extended outwardly from said panel to enclose said access opening and an open position wherein said inner window is retracted into said panel; and second means for selectively extending and retracting said outer window relative to said panel between the closed position and open position.

6. The system of claim 1 or 2 or 3 or 4 or 5, wherein said window and said shield are congruent.

7. The system of claim 1 or 2 or 3 or 4 or 5, wherein said outer window is opaque.

8. The system of claim 1 or 2 or 3 or 4 or 5, wherein said outer window is transparent.

9. The system of claim 2 or 5, wherein said moving means includes first and second electric motors; first and second electrical switches within a cabin of said vehicle for operating respectively said first and second motors, and means for coupling the outputs of said motors to said windows.

10. The system of claim 2 or 5, wherein said moving means includes an electric motor, first and second electric switches within a cabin of said vehicle; first means for coupling together the output of said motor and said inner window; second means for coupling together the output of said motor and said outer window, said first coupling means and second coupling means being operable independently of each other controlled respectively by said first and second electric switches.

11. The system of claim 2 or 3 or 4 or 5, including means for enabling opening of said inner window only when said outer window is open.

12. The system of claim 2 or 3 or 4 or 5, including means for causing simultaneous opening or simultaneous closing of said inner and outer windows.

13. The system of claim 2 or 4, further comprising an angle bracket retaining said sealing means, said angle bracket adapted for attachment to a roof of said vehicle, thereby further preventing prying around the upper end of said outer window to gain access into said vehicle.

14. The system of claim 1 or 2 or 3 or 4 or 5, further comprising a central rail positioned intermediate said inner and outer windows and an inner gasket disposed upon said central rail for stabilizing and maintaining said inner and outer windows separated from each other.

* * * * *